(12) United States Patent
Chiu et al.

(10) Patent No.: US 11,427,028 B2
(45) Date of Patent: Aug. 30, 2022

(54) BICYCLE WHEEL AND METHOD OF MANUFACTURING THE SAME

(71) Applicant: Corex Materials Corporation, Changhua (TW)

(72) Inventors: Shao-Chen Chiu, Taichung (TW); Chia-Ming Ku, Changhua County (TW)

(73) Assignee: Corex Materials Corporation, Changhua (TW)

( * ) Notice: Subject to any disclaimer, the term of this patent is extended or adjusted under 35 U.S.C. 154(b) by 803 days.

(21) Appl. No.: 16/159,051

(22) Filed: Oct. 12, 2018

(65) Prior Publication Data

US 2020/0114599 A1    Apr. 16, 2020

(51) Int. Cl.
*B60B 21/06* (2006.01)
*B29C 70/74* (2006.01)
*B29C 70/54* (2006.01)
*B29C 70/86* (2006.01)
*B29K 77/00* (2006.01)
*B29K 101/12* (2006.01)
*B29L 31/32* (2006.01)
*B29K 679/00* (2006.01)
*B29L 31/30* (2006.01)
*B29K 69/00* (2006.01)

(52) U.S. Cl.
CPC .......... *B60B 21/062* (2013.01); *B29C 70/742* (2013.01); *B29C 70/545* (2013.01); *B29C 70/86* (2013.01); *B29K 2069/00* (2013.01); *B29K 2077/00* (2013.01); *B29K 2101/12* (2013.01); *B29K 2679/085* (2013.01); *B29L 2031/3091* (2013.01); *B29L 2031/32* (2013.01); *B60B 2310/318* (2013.01); *B60B 2360/104* (2013.01); *B60B 2900/111* (2013.01)

(58) Field of Classification Search
CPC ... B60B 21/062; B60B 5/02; B60B 2900/111; B29C 70/742; B29C 70/545; B29C 70/86; B29K 2077/00
See application file for complete search history.

(56) References Cited

U.S. PATENT DOCUMENTS 3,782,778 A * 1/1974 Tomozawa ................ B60B 3/08
                                                    301/110.5
5,529,826 A * 6/1996 Tailor .................... B32B 27/302
                                                    428/36.1
(Continued)

FOREIGN PATENT DOCUMENTS

CN         2889751 Y  *  4/2007
CN         201136410        10/2008
(Continued)

OTHER PUBLICATIONS

Extended European Search Report.

*Primary Examiner* — Scott A Browne
(74) *Attorney, Agent, or Firm* — Rabin & Berdo, P.C.

(57) ABSTRACT

A bicycle wheel has a wheel frame. The wheel frame is a hollow and annular frame and is composited by multiple equally sized wheel bars. Each one of the wheel bars has two halves connected to each other to form the wheel bar, and each one of the two halves being made by laminating, heating and forming a thermoplastic prepreg. The equally sized wheel bars are connected to each other to form the bicycle wheel.

6 Claims, 14 Drawing Sheets

(56) References Cited

U.S. PATENT DOCUMENTS

| | | | |
|---|---|---|---|
| 6,428,114 B1 * | 8/2002 | Sebode | B60B 1/06 |
| | | | 301/64.102 |
| 2007/0102992 A1 * | 5/2007 | Jager | B60B 21/025 |
| | | | 301/30 |
| 2010/0301663 A1 * | 12/2010 | Kismarton | B60B 5/00 |
| | | | 301/64.704 |

FOREIGN PATENT DOCUMENTS

| | | | | |
|---|---|---|---|---|
| DE | 10120203 | A1 * | 10/2002 | B60B 5/02 |
| DE | 102006010445 | A1 | 9/2007 | |
| EP | 0026514 | A1 | 4/1981 | |
| JP | H05286060 | A | 11/1993 | |
| JP | H0667102 | U | 9/1994 | |
| JP | H072103 | U | 1/1995 | |
| JP | 2000289401 | A | 10/2000 | |
| JP | 2007161239 | A | 6/2007 | |
| JP | 2010149863 | A | 7/2010 | |
| JP | 2018502764 | A | 2/2018 | |
| TW | M353106 | U | 3/2009 | |
| TW | I352669 | B | 11/2011 | |
| TW | 201313456 | A | 4/2013 | |
| TW | M514888 | U | 1/2016 | |
| TW | M552442 | U | 12/2017 | |
| WO | WO-2004074081 | A2 * | 9/2004 | B60B 21/02 |
| WO | 2013187418 | A1 | 12/2013 | |

* cited by examiner

BICYCLE WHEEL AND METHOD OF MANUFACTURING THE SAME

BACKGROUND OF THE INVENTION

1. Field of the Invention

The present invention relates to a bicycle wheel, and more particularly relates to a bicycle wheel and a method of manufacturing the bicycle wheel that may achieve effects of lightweight and structural strength.

2. Description of Related Art

In general, bicycles are one of the most popular leisure activities at present. In order to provide users with more convenient and easier riding effects, most manufacturers will develop and improve bicycles through various structural designs, material compositions, or transmission methods. For example, for a frame or rim of a bicycle, the manufacturers will prefer to choose lighter materials, and composite materials are one of the choices. Among a wide variety of composite materials, fiber reinforced polymer composite materials are the most widely used. The basic composition of polymer composite materials is fiber and polymer resin base material. Fiber is the main factor that determines the mechanical properties of composite materials, and is used to withstand the main load, improve the rigidity and fatigue resistance of the material, and deformation properties. There are many types of thermoplastics, such as polycarbonate (PC) and polyamide (PA), etc. Furthermore, fibers have different materials and forms. Commonly used materials of fibers in the industry include glass fibers, carbon fibers, and Kevlar fibers. The forms of fibers include spun fiber, continuous fiber, woven fiber, and chopped fiber. In addition, in the application of structure, due to higher material strength requirements, the continuous fiber is the main choice of reinforcing fibers.

Further, the rim is an important medium for the entire bicycle to convert energy into speed, and the quality of the rim affects the riding speed, the pedaling force, and the breaking of the wind. In addition to the lightweight, the inertia, the smoothness, and the rigidity and low wind resistance are also among the important considerations. Therefore, how to achieve a balance between lightweight and structural strength is strongly sought in the existing industries to improve the quality of the bicycle rims.

To overcome the shortcomings, the present invention provides a bicycle wheel and its adapter to mitigate or obviate the aforementioned problems.

SUMMARY OF THE INVENTION

The main objective of the present invention is to provide a bicycle wheel and a method of manufacturing the bicycle wheel that may achieve effects of lightweight and structural strength.

The bicycle wheel in accordance with the present invention has a wheel frame. The wheel frame is a hollow and annular frame and is composited by multiple equally sized wheel bars. Each one of the wheel bars has two halves connected to each other to form the wheel bar, each one of the two halves being made by laminating, heating and forming a thermoplastic prepreg. The equally sized wheel bars are connected to each other to form the bicycle wheel.

Other objects, advantages and novel features of the invention will become more apparent from the following detailed description when taken in conjunction with the accompanying drawings.

DETAILED DESCRIPTION OF THE PREFERRED EMBODIMENT

Figure 1:
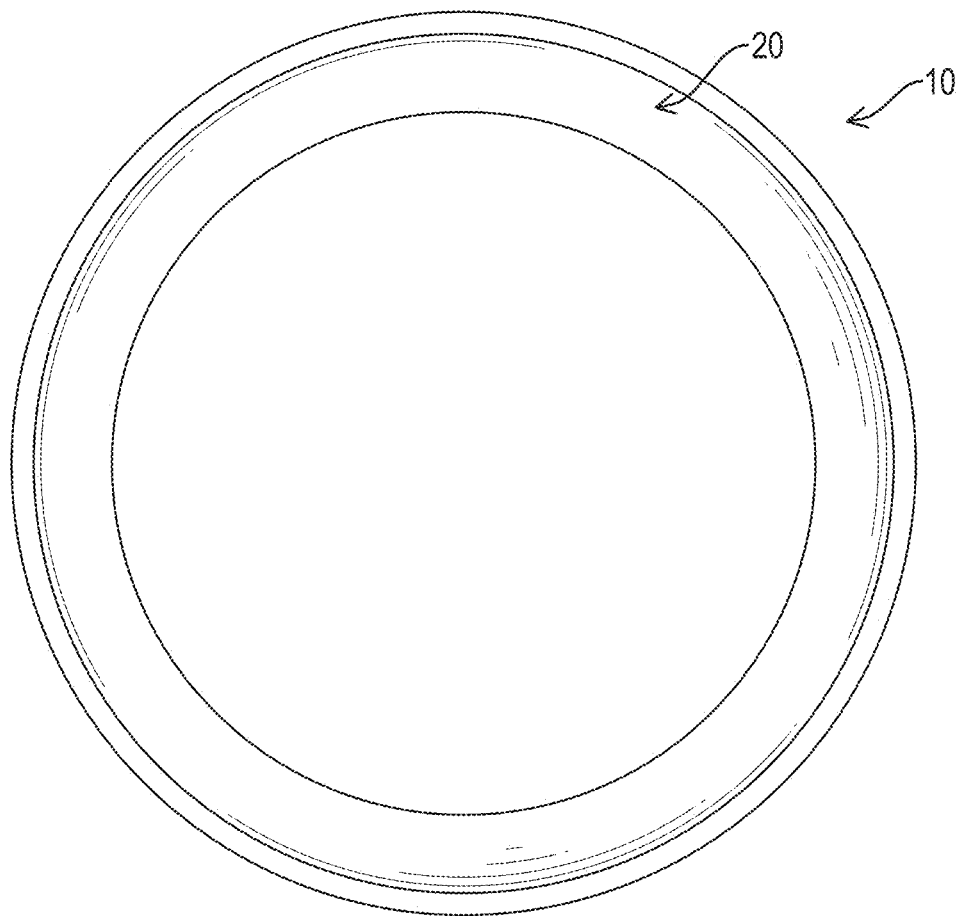
FIG. 1 is a perspective side view of a first embodiment of a bicycle wheel in accordance with the present invention.
Figure 7:
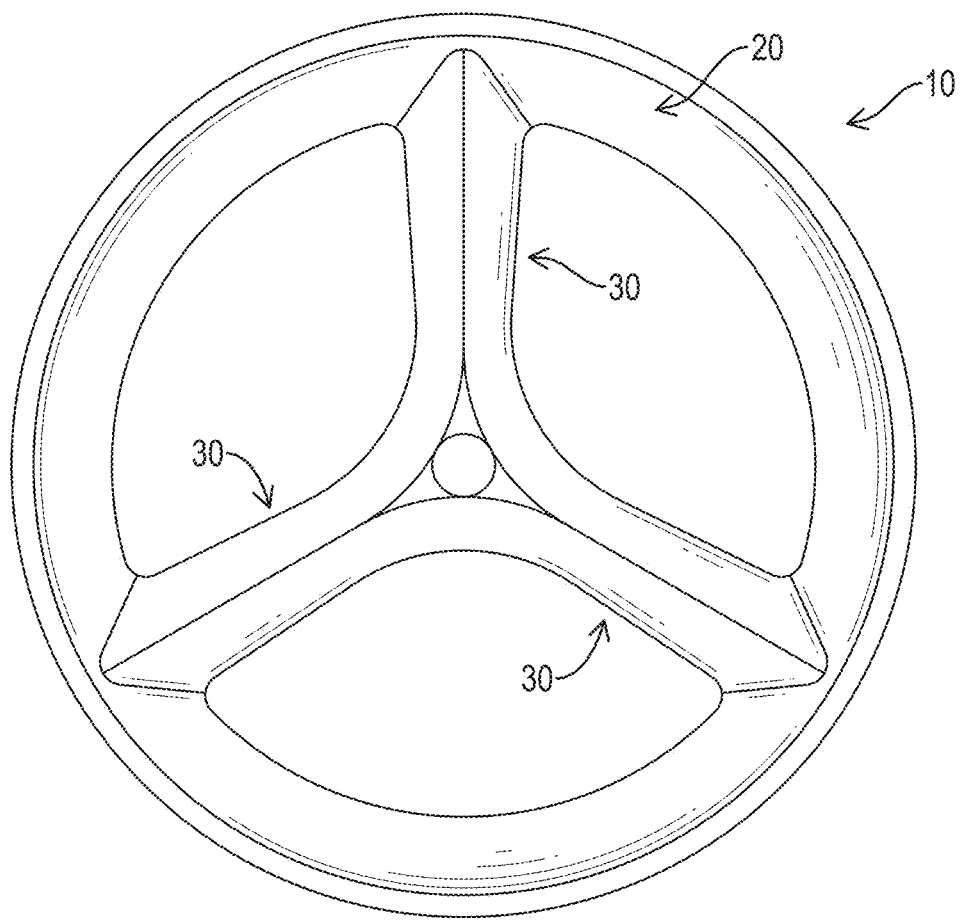
FIG. 7 is a perspective side view of a second embodiment of a bicycle wheel in accordance with the present invention.

FIGS. 1 and 7 show a first embodiment and a second embodiment of a bicycle wheel 10 in accordance with the present invention, respectively. In the first embodiment of the bicycle wheel 10, the bicycle wheel 10 has a wheel frame 20, and in the second embodiment of the bicycle wheel 10, the bicycle wheel 10 has a wheel frame 20 and multiple ribs 30.

Figure 2:
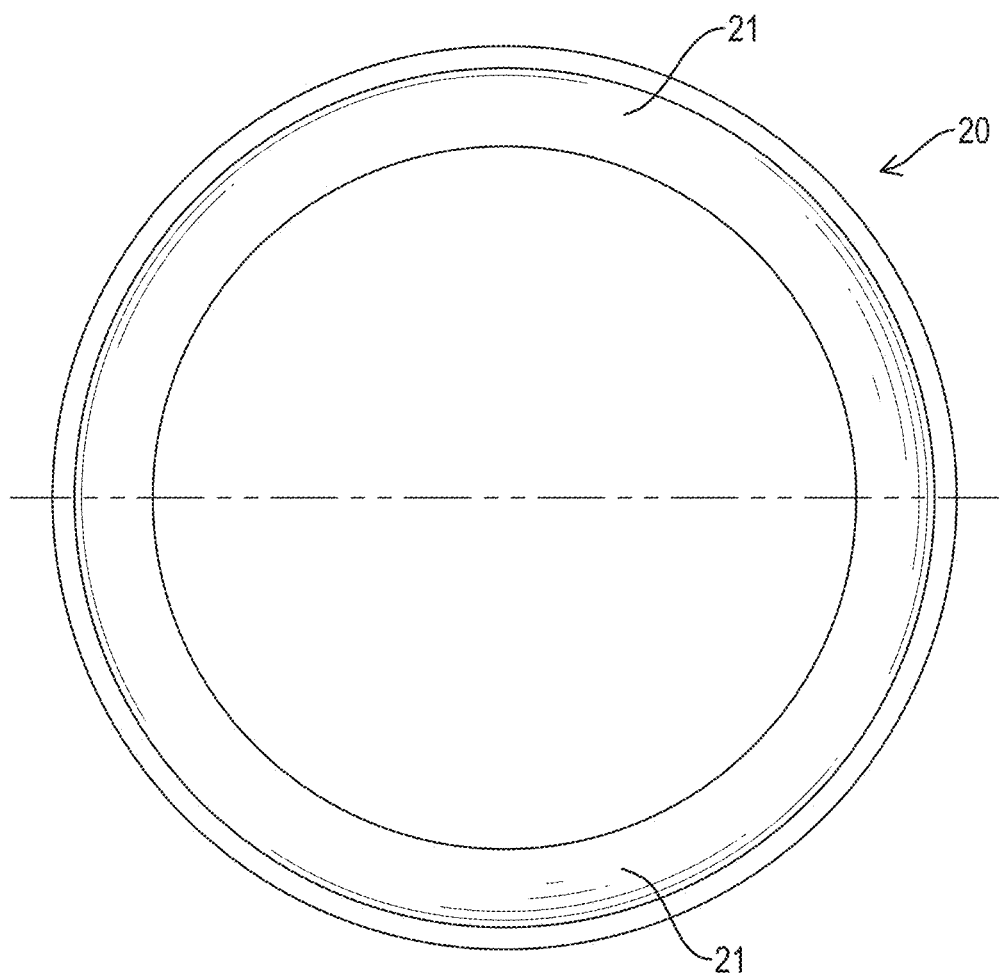
FIG. 2 is an operational perspective side view of a wheel frame of the bicycle wheel in FIG. 1, dismantled into two equal parts.
Figure 3:
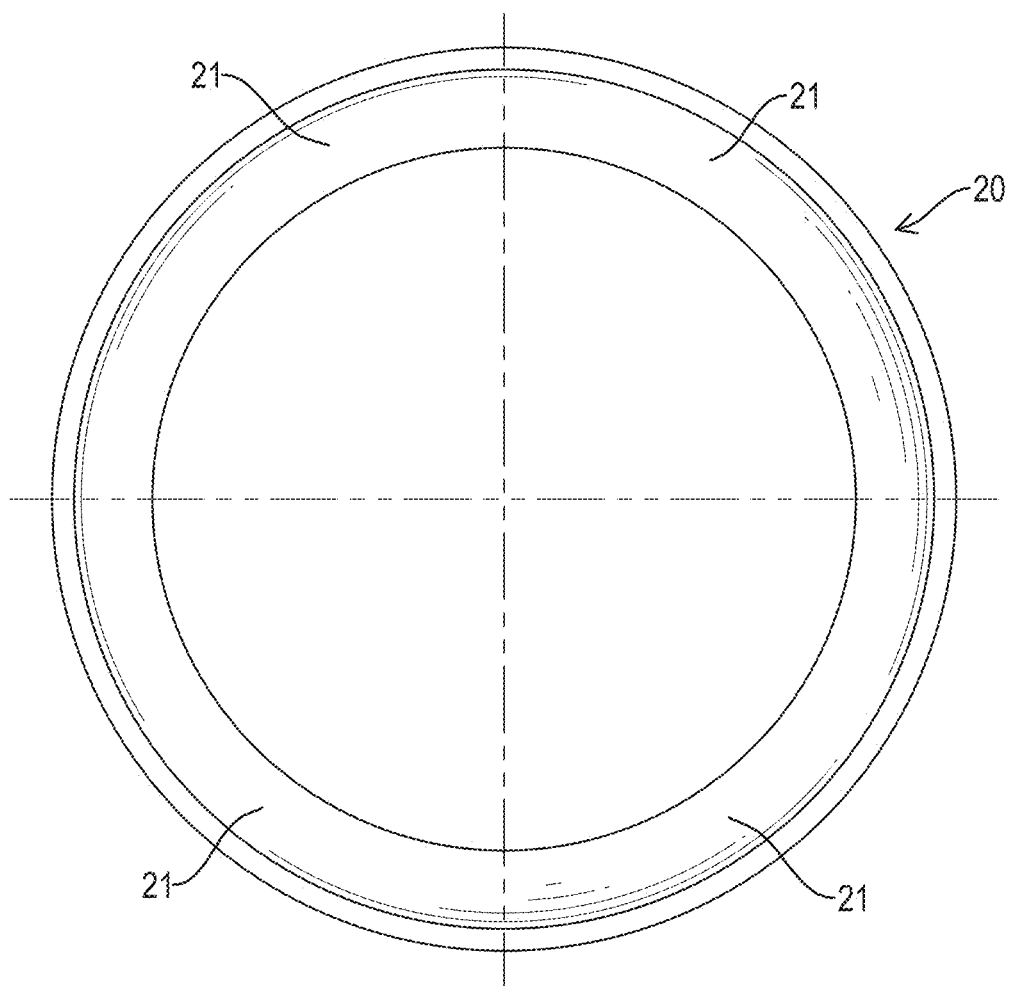
FIG. 3 is an operational perspective side view of the wheel frame of the bicycle wheel in FIG. 1, dismantled into four equal parts.
Figure 4:
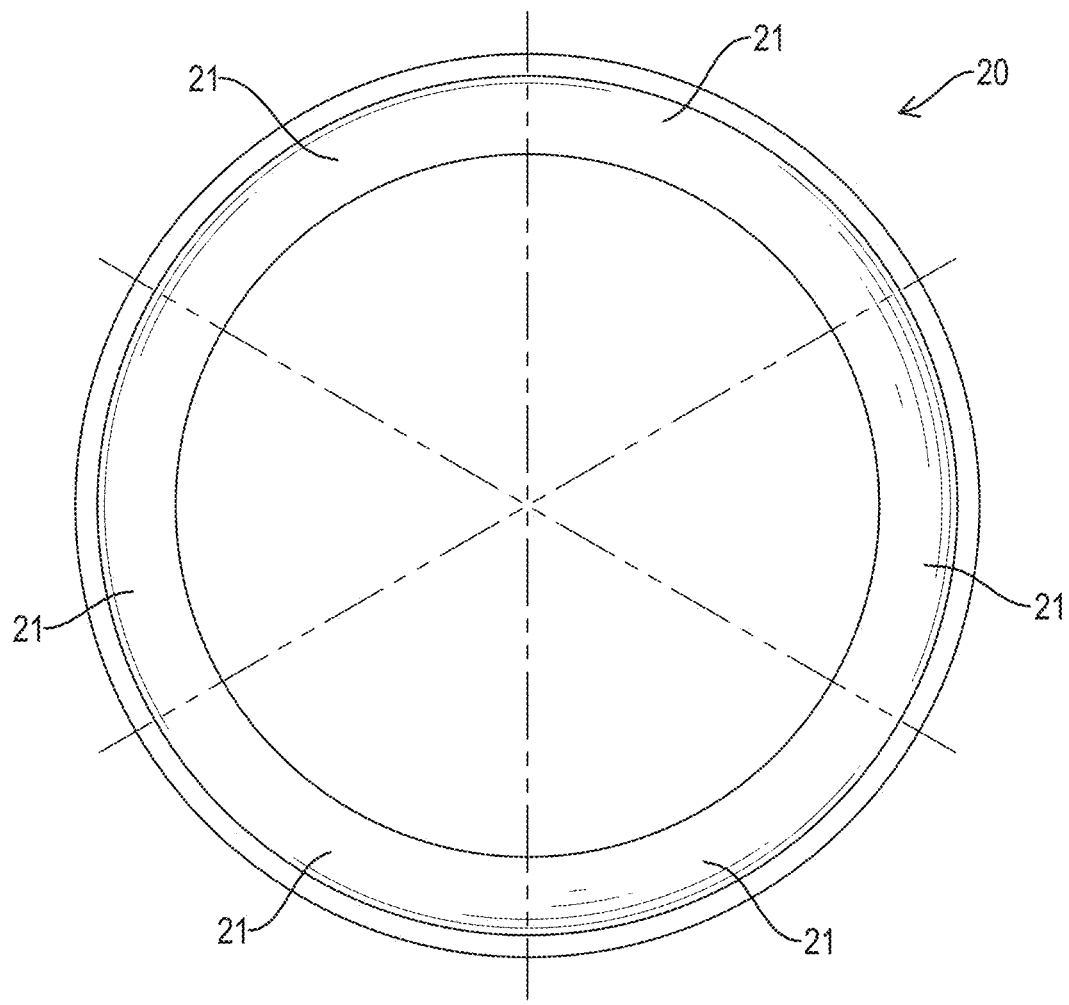
FIG. 4 is an operational perspective side view of the wheel frame of the bicycle wheel in FIG. 1, dismantled into six equal parts.

The wheel frame 20 is a hollow and annular frame and is composited by multiple wheel bars 21. With reference to FIGS. 2, 3, and 4, the wheel frame 20 is composed of two equal parts of wheel bars 21, four equal parts of wheel bars 21 or six equal parts of wheel bars 21, and all of the wheel bars 21 are of an equal size. Furthermore, the wheel frame 20 also can be composed of three equal parts of wheel bars 21 or five equal parts of wheel bars 21, etc. Additionally, the wheel frame 20 is composed by 2 to 10 equally sized wheel bars 21. Each one of the wheel bars 21 has two halves.

Figure 5:
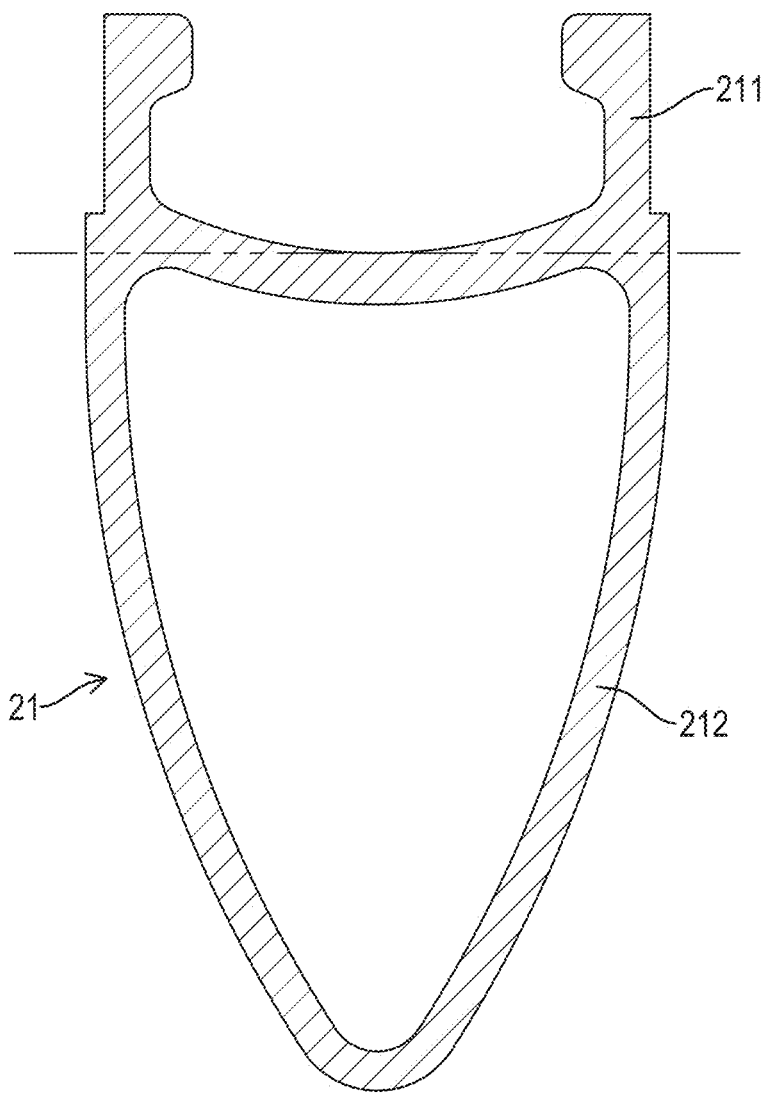
FIG. 5 is an operational and cross sectional side view of a wheel bar of the wheel frame in FIG. 1, dismantled into two equal parts.
Figure 6:
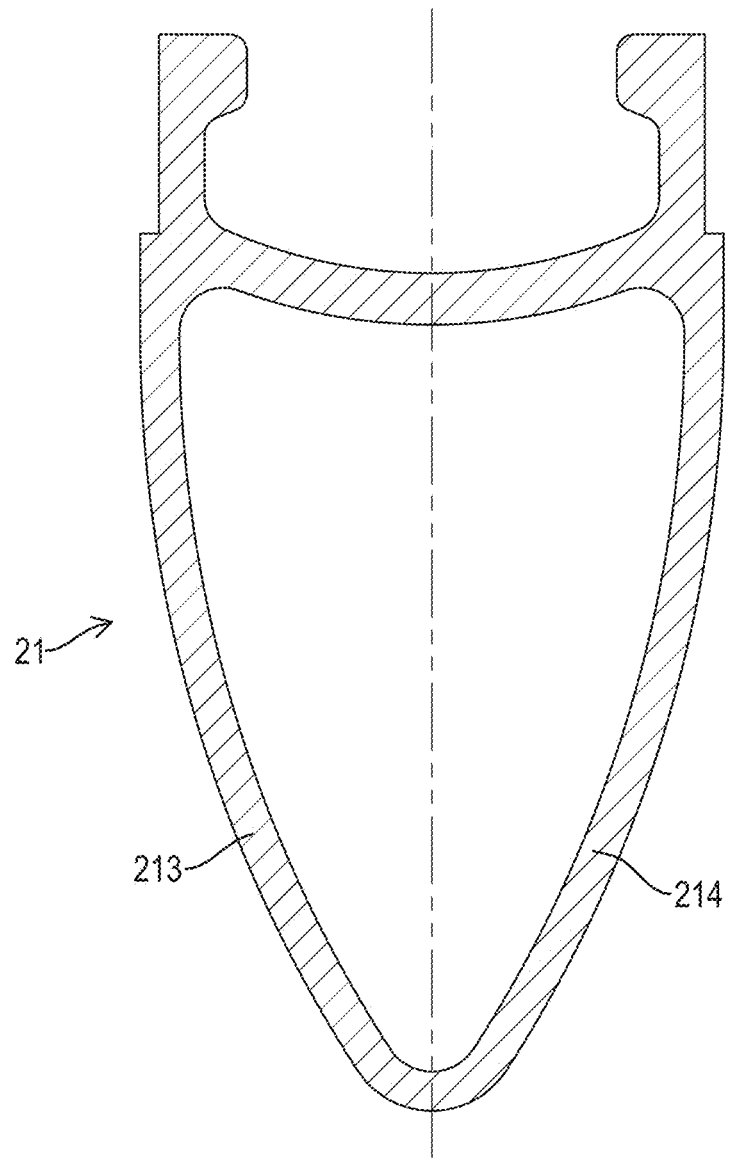
FIG. 6 is another operational and cross sectional side view of the wheel bar of the wheel frame in FIG. 1, dismantled into two equal parts.

With reference to FIG. 5, each wheel bar 21 has an upper half 211 and a lower half 212. The upper half 211 may be an outer frame segment of the wheel frame 20. The lower half 212 is connected to the upper half 211 to form the wheel bar 21 and may be an inner frame segment of the wheel frame 20. With reference to FIG. 6, each wheel bar 21 has a left half 213 and a right half 214. The right half 214 is connected to the upper half 211 to form the wheel bar 21. Each half 211, 212, 213, 214 of the wheel bar 21 is made by laminating, heating and forming a thermoplastic prepreg 40, and the two corresponding halves 211, 212, 213, 214 are combined to form a wheel bar 21. The multiple wheel bars 21 are connected to each other to form the wheel frame 20. Additionally, two corresponding halves 211, 212, 213, 214 of each wheel bar 21 or multiple wheel bars 21 are connected to each other by the bonding ability of the material itself or by combining an additional additive between the two corresponding halves 211, 212, 213, 214 of each wheel bar 21 or multiple wheel bars 21. Then, the wheel frame 20 is formed by the halves 211, 212, 213, 214 and the wheel bars 21.

Figure 8:
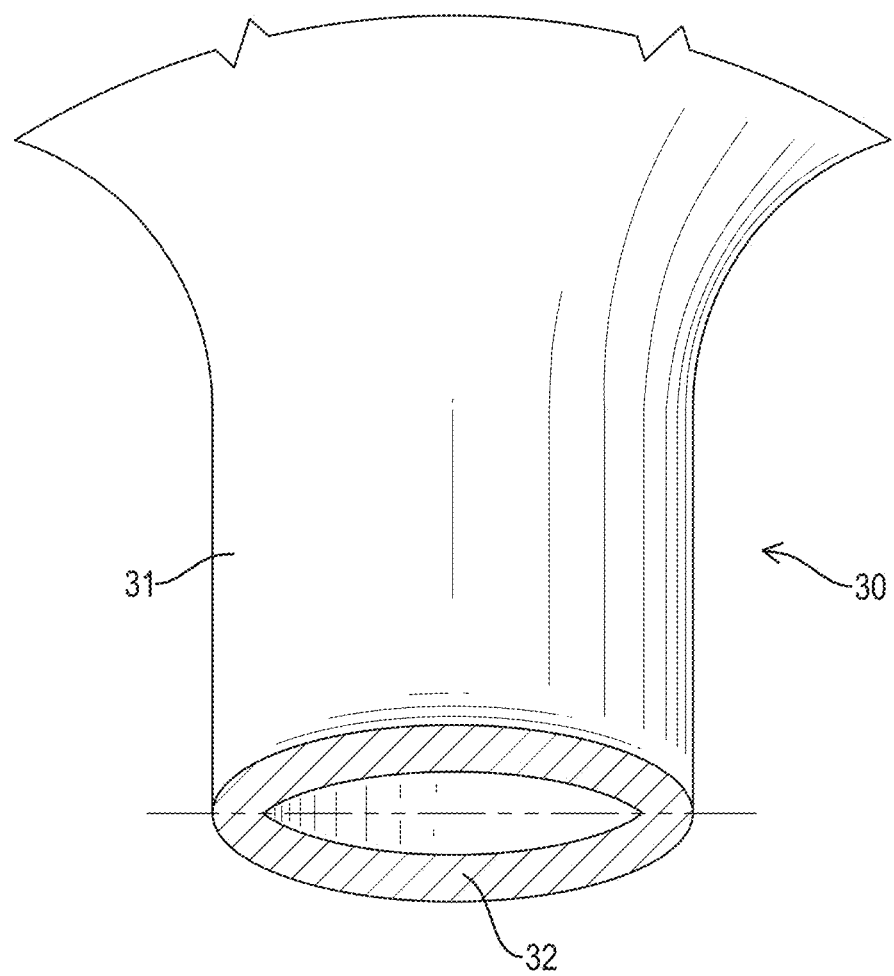
FIG. 8 is an operational perspective view of a rib of the bicycle wheel in FIG. 7, dismantled into two equal parts.

With reference to FIG. 7, in the second embodiment of the bicycle wheel in accordance with the present invention, the ribs 30 are radially spaced apart from the wheel frame 20, and each one of the ribs 30 has an inner end and an outer end. The inner ends of the ribs 30 are connected to each other. The outer ends of the ribs 30 are connected to an inner side of the wheel frame 20. Then, the bicycle wheel 10 is formed by the wheel frame 20 and the multiple ribs 30. With reference to FIG. 8, each rib 30 has an upper half 31 and a lower half 32. The lower half 32 is connected to the upper half 31 to form the rib 30. Furthermore, with reference to FIG. 9, each rib 30 may have a left half 33 and a right half 34. The right half 34 is connected to the left half 33 to form the rib 30.

Figure 14:
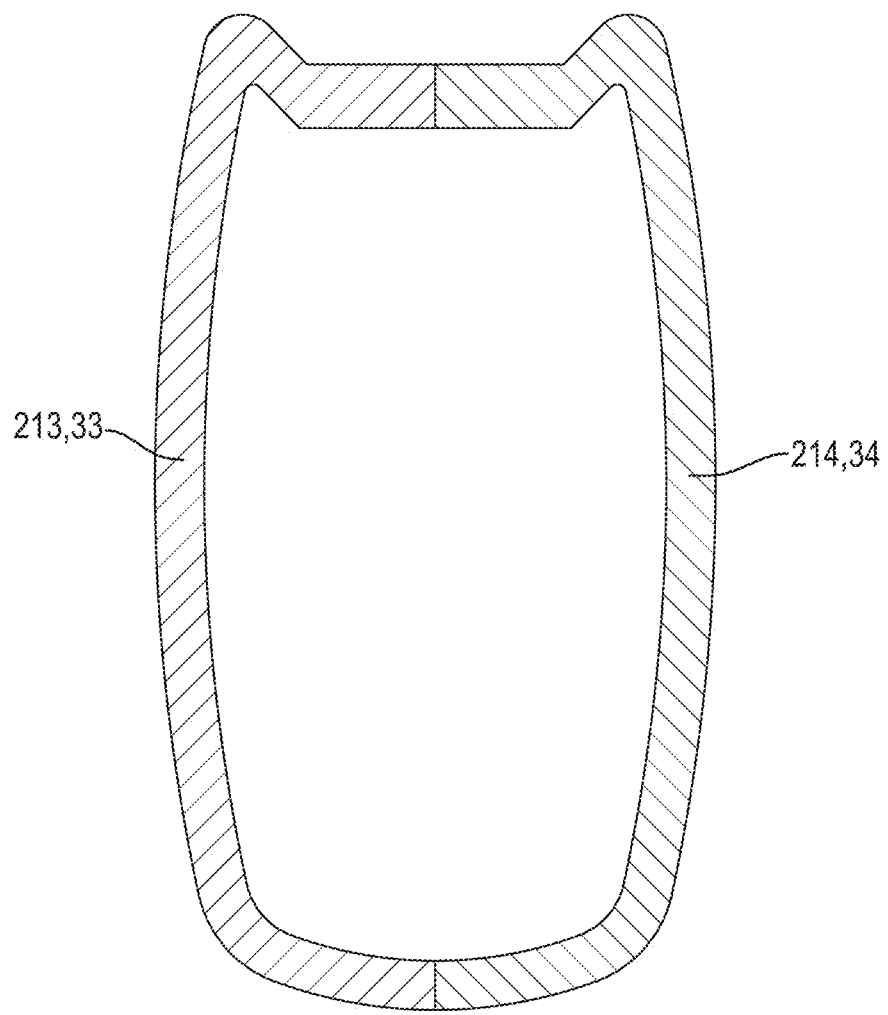
FIG. 14 is an operational perspective view of connecting parts of the bicycle wheel in the present invention.

Each half 31, 32, 33, 34 of the rib 30 is made by laminating, heating and forming a thermoplastic prepreg 40, and the two corresponding halves 31, 32, 33, 34 are combined to form a rib 30. The multiple ribs 30 are connected to each other and connected to the wheel frame 20 to form the bicycle wheel 10. Additionally, with reference to FIG. 14, two corresponding halves 213, 214, 33, 34 of each rib 30, or multiple ribs 30 and the wheel frame 20 are connected to each other by the bonding ability of the material itself or through a combination of additives.

Figure 10:
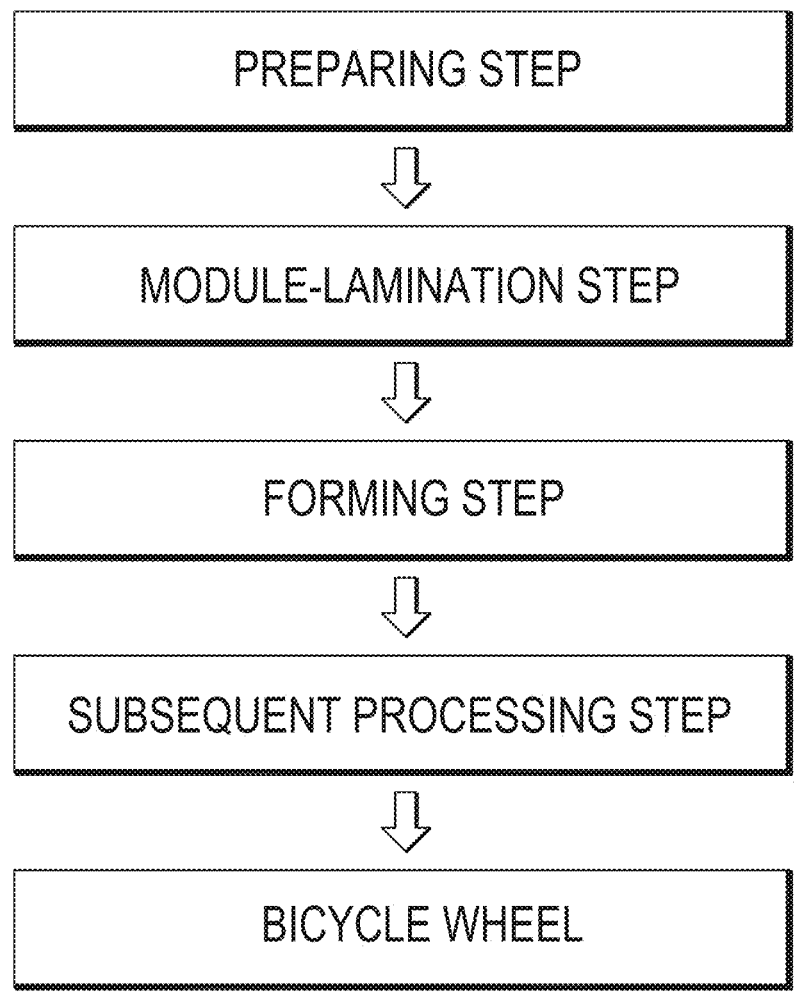
FIG. 10 is a block flow diagram of a method of manufacturing a bicycle wheel in accordance with the present invention.

With reference to FIG. 10, a method of manufacturing a bicycle wheel 10 in accordance with the present invention has a preparing step, a module-lamination step, a forming step, and a subsequent processing step.

With reference to FIGS. 10 to 13, the preparing step comprises preparing a thermoplastic prepreg 40, multiple modular molds 70, a cutting device, a heating device, a molding device, and at least one processing machine. The thermoplastic prepreg 40 is formed by impregnating a continuous fiber with a resin, a fiber woven cloth or a chopped fiber. In addition, the continuous fiber, the fiber woven cloth and the chopped fiber may be a carbon fiber, a glass fiber or a reinforced fiber. With reference to FIGS. 2 to 6, 8, and 9, the bicycle wheel 10 is disassembled into several parts (wheel frame 20 and ribs 30) according to the shape and size of each part. The modular molds 70 have outer dimensions and structures corresponding to the parts of the bicycle wheel 10. After forming the thermoplastic prepreg 40, the thermoplastic prepreg 40 is precut by the cutting machine according to the outer dimensions of each one of the parts of the wheel frame 20 and the ribs 30. After pre-cutting the thermoplastic prepreg 40, the multiple thermoplastic prepreg 40 are stacked with each other and are heated by the heating device to from a thermoplastic composite material 50. The at least one processing machine is used in the subsequent processing step after the forming step.

Figure 9:
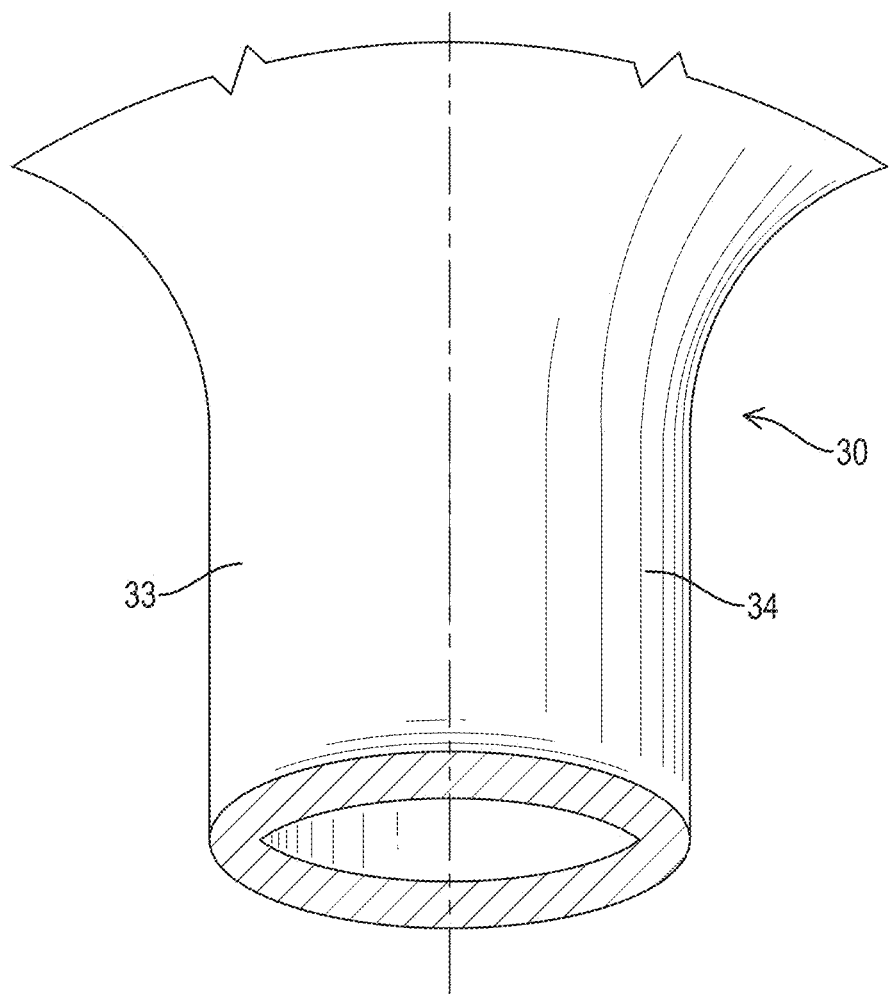
FIG. 9 is another operational perspective view of the rib of the bicycle wheel in FIG. 7, dismantled into two equal parts.
Figure 11:
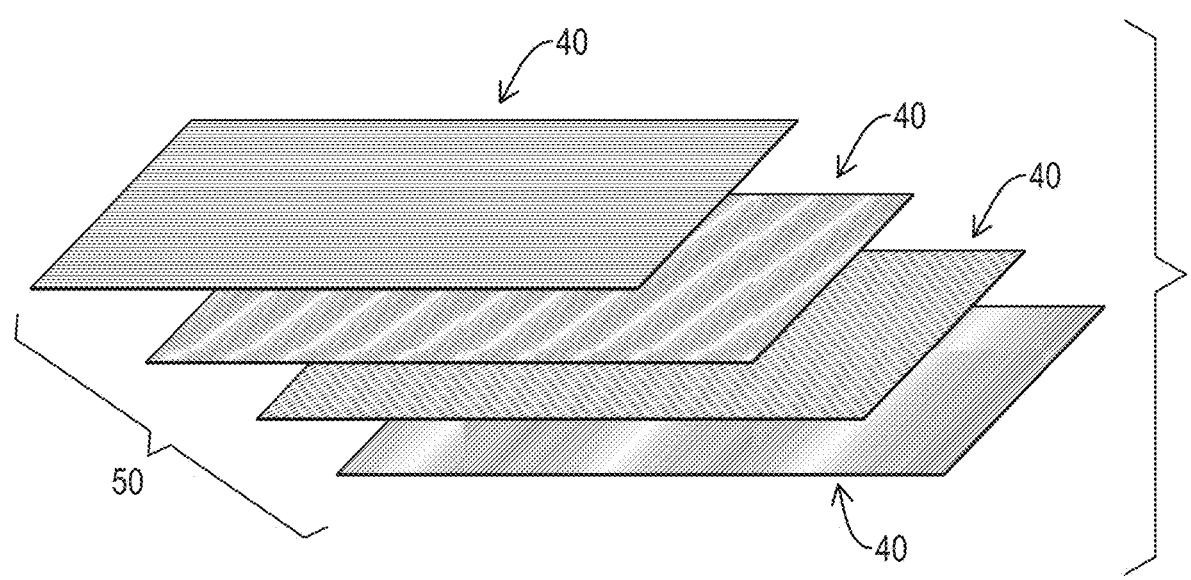
FIG. 11 is an operational perspective view of stacking multiple thermoplastic prepreg with each other.

With reference to FIGS. 2, 8, and 9, the module-lamination step comprises disassembling the bicycle wheel 10 into two parts of the wheel frame 20 and the ribs 30, and disassembling each one of the parts of the wheel frame 20 and the ribs 30 into multiple halves 211, 212, 213, 214, 31, 32, 33, 34. With reference to FIG. 11, according to the mechanical properties, dimensions and thickness requirements of various parts, and the design of the modular molds 70, the number of laminated layers of the thermoplastic prepreg 40 and the orientation of the fiber angles of each layer of the thermoplastic prepreg 40 will be determined, wherein the fiber angle is between −180 and 180 degrees. The thermoplastic prepreg 40 is pre-cut by the cutting device and is disposed on the heating device. The heating temperature of the heating device must be greater than the glass transition temperature (Tg, 150 to 190° C.) of the thermoplastic prepreg 40, and is between 250° C. and 300° C. The viscosity characteristic of the resin of each layer of the thermoplastic prepreg 40 allows the stacked prepreg 40 to be pre-bonded to form the thermoplastic composite material 50.

Figure 12:
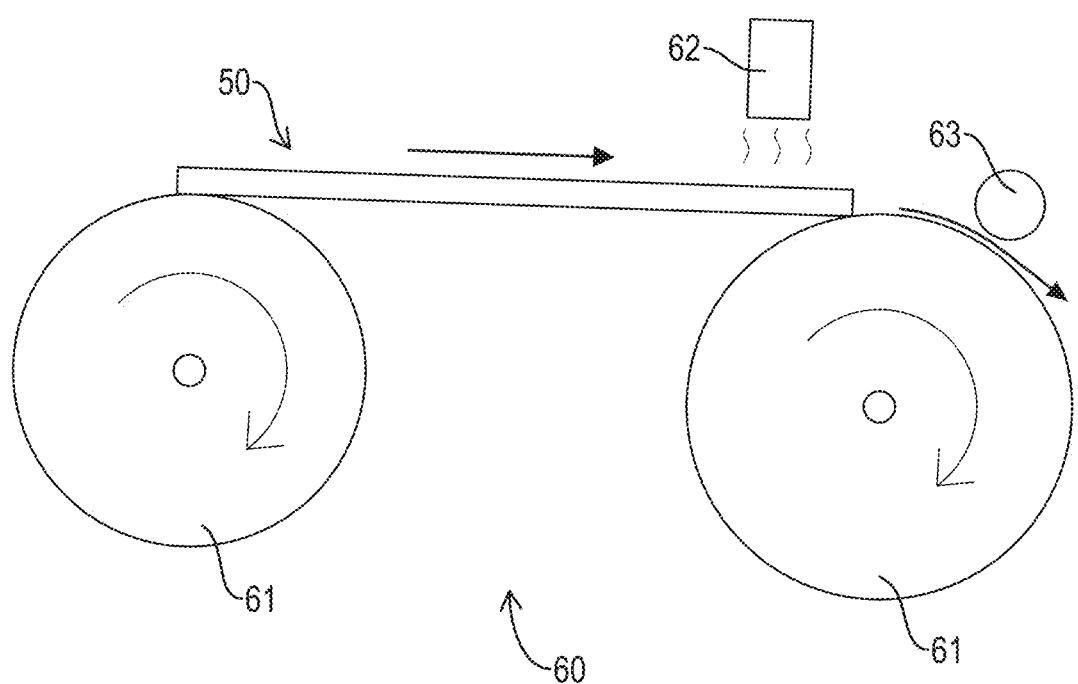
FIG. 12 is an operational perspective view of forming the bicycle wheel in the present invention.

The forming step comprises forming the parts of the bicycle wheel 10 by the modular molds 70 or the molding device at the temperature of 180 to 300° C. under the pressure of 1 to 15 Mpa and for the time of 5 to 15 minutes and under other parameter conditions. After forming the parts of the bicycle wheel 10, the parts are connected to each other by the bonding ability of the thermoplastic composite material 50 or an additive to complete the overall structure of the bicycle wheel 10. With reference to FIG. 12, the thermoplastic composite material 50 is processed by a rolling machine 60, and the rolling machine 60 has a rotating roller 61, a heating source 62, and at least one pressing roller 63. Then, the thermoplastic composite material 50 is heat pressed, rolled, processed by pultrusion, etc.

Figure 13:
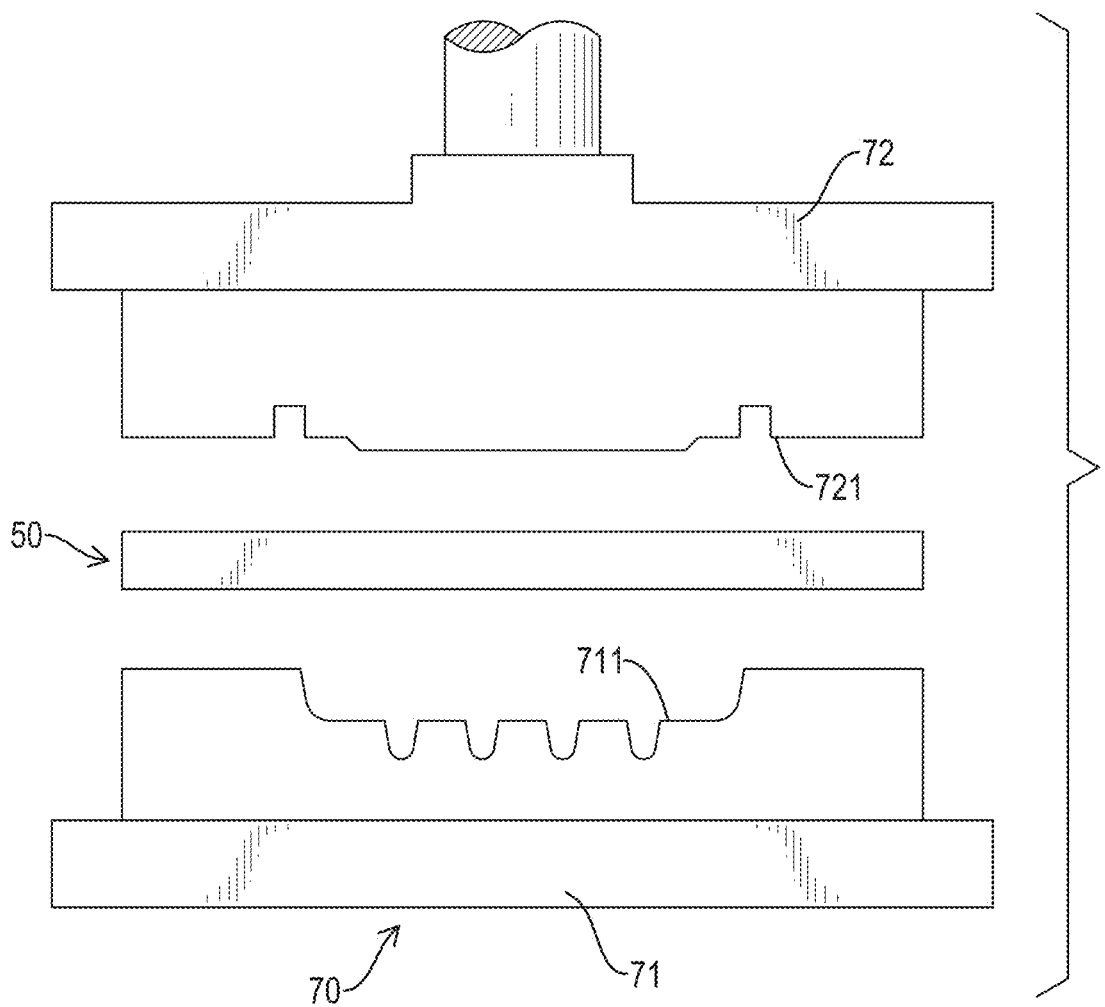
FIG. 13 is another operational perspective view of forming the bicycle wheel in the present invention.

Additionally, with reference to FIG. 13, the thermoplastic composite material 50 is put into the modular mold 70, and the modular mold 70 has a lower mold 71 and an upper mold 72. Each mold 71, 72 has a cavity 711, 712. The thermoplastic composite material 50 is put between the two cavities 711, 712 of the molds 71, 72, and is formed by the above-mentioned temperature, pressure, and time. The purpose of the high temperature is to allow the resin to flow, using its viscosity characteristics to allow inter-laminar resin diffusion and bonding, while the pressure can closely arrange the fibers between the layers, and when the temperature drops below Tg, the mold 70 is de-molded to obtain a finished product.

The subsequent processing step comprises subsequent processing the finished product by the at least one processing machine such as stamping or CNC. Furthermore, if the finished product in the forming step is formed by the modular mold 70, the material in the non-finished area can be cut and separated after the finished product is molded, and the finished product of the bicycle wheel 10 can be obtained.

According to the above-mentioned features and structural relationships, the bicycle wheel 10 of the present invention mainly uses the thermoplastic composite material 50 with laminated design, time, temperature, pressure and other parameter conditions, the bicycle wheel 10 is disassembled by a modular concept, and then the parts can be processed based on the product mechanical properties, size, thickness requirements, in association with design of the modular molds 70. Then, the cutting size of the thermoplastic prepreg

40, the number of the stacked thermoplastic prepreg(s) 40, and the orientation of the fibers in each layer can be determined to achieve the required rigidity of the bicycle wheel 10, and the overall weight of the bicycle wheel 10 can be reduced. Furthermore, by various different forming methods such as heat pressing, rolling, pultrusion, vacuum heating or mold forming, the bicycle wheel 10 is manufactured. By joining or adding materials (such as glue) that can be bonded to the polymer, the polymers in the resin are bonded to each other to provide an excellent bonding strength. Then, the bicycle wheel 10 that is made by the method of the present invention can achieve the effects of lightweight and structural strength, and the practicality of the bicycle wheel 10 can be increased and the quality of the bicycle wheel 10 can be significantly improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bicycle wheel having:
   a wheel frame being a hollow and annular frame and having
      multiple equally sized wheel bars that are modularly connected to form the wheel frame, and each one of the equally sized wheel bars having
         two halves, which are respectively an upper half and a lower half, connected to each other to form the wheel bar, and each one of the two halves being made by laminating, heating and forming a thermoplastic prepreg according to a design of a modular mold, the thermoplastic prepreg having a number of laminated layers, each layer having an orientation of fiber angles corresponding to mechanical properties, dimensions, and a thickness of the bicycle wheel; wherein
      the equally sized wheel bars are connected to each other to form the wheel frame;
      the bicycle wheel has multiple ribs radially spaced apart from the wheel frame, and each one of the ribs has
         an inner end, and the inner ends of the ribs connected to each other; and
         an outer end, and the outer ends of the ribs connected to an inner side of the wheel frame;
      each rib has two halves connected to each other to form the rib, and each one of the two halves is made by laminating, heating and forming a thermoplastic prepreg; and
      the multiple ribs are connected to the wheel frame to form the bicycle wheel.

2. The bicycle wheel as claimed in claim 1, wherein the wheel frame has 2 to 10 said equally sized wheel bars.

3. The bicycle wheel as claimed in claim 2, wherein the two halves of each wheel bar or the multiple wheel bars are connected to each other by the bonding ability of a material itself to form the wheel frame.

4. The bicycle wheel as claimed in claim 1, wherein the two halves of each wheel bar or the multiple wheel bars are connected to each other by the bonding ability of a material itself to form the wheel frame.

5. The bicycle wheel as claimed in claim 2, wherein the two halves of each wheel bar or the multiple wheel bars are connected to each other through a combination of additives to form the wheel frame.

6. The bicycle wheel as claimed in claim 1, wherein the two halves of each wheel bar or the multiple wheel bars are connected to each other through a combination of additives to form the wheel frame.

* * * * *